Patented Sept. 3, 1935

2,013,077

UNITED STATES PATENT OFFICE 2,013,077

ORGANIC COLORING MATERIAL COMPRISING AN AZO COMPOUND AND NITRO ROSIN AS A SUBSTRATUM

Alfred Siegel, Hillside, N. J., assignor to Krebs Pigment & Color Corporation, Newark, N. J., a corporation of Delaware No Drawing. Application October 16, 1933, Serial No. 693,825

5 Claims. (Cl. 134—58.5)

The present invention comprises novel azo lakes or pigments in which the azo compound is associated with a substratum comprising a nitro rosin and processes of making the same.

Nitro rosins are prepared, for instance, by nitrating abietic acid in a solvent as described by Goldblatt, Lowy and Burnett in Journal of American Chemical Society, v. 52, page 2133 (1930). The product which I have obtained by this procedure was a mixture of a di-nitro rosin (a white crystalline di-nitro acid, $C_{19}H_{26}N_2O_6$, m. p. 171.2-171.4°) and a yellow amorphous nitrogen-containing product (a hydroxylated nitro derivative of abietic acid, decomposing above 100° C., slightly soluble in chloroform, carbon tetrachloride, and petroleum ether).

I have, jointly with E. R. Allen, shown in U. S. Patent Re. 18,590 that the development of azo lakes and pigments in the presence of metallic rosinates produces novel products containing the metallic rosinates as the substratum and that those novel lakes and pigments are distinguished by valuable tinctorial properties.

I have found that nitrated rosins can also act as substrata for azo lakes and pigments when the development of the lake or pigment is carried out in the presence of a nitro rosin compound.

The process of my invention comprises, therefore, developing by heating an aqueous suspension of an insoluble azo coloring compound or salt in the presence of an insoluble salt of a nitro rosin.

By the term development I refer to that step of the process of making lakes or pigments in which an insoluble azo compound is heated in an aqueous suspension with a substratum. During this operation some physical and/or chemical changes take place, the azo compound combines with the substratum and the full tinctorial value of the pigment is obtained.

The suspension of the azo compound and the nitro rosin compound as used in my invention can be obtained in any desired manner.

I can, for instance, add a soluble nitro rosin salt to either the diazotized amine or the coupling compound which when combined form the azo compound, and then add thereto a precipitating salt which will jointly form the insoluble azo salt and the insoluble nitro rosin salt and then develop the so obtained suspension with or without preliminary purification. I can also separately prepare the azo compound, add the soluble nitro rosin soap thereto and again jointly precipitate their insoluble salts, or I can separately prepare the insoluble azo compound and the insoluble nitro rosin salt, mix the two and proceed with development, or I can prepare my aqueous suspension in any other manner as will be obvious to those skilled in the art.

The insoluble salts of the nitro rosin used in the development of my novel lakes and pigments are prepared by the action of alkaline earth or heavy metal salts upon the more or less soluble alkali metal salts of the nitro rosin. Calcium, barium, aluminum, zinc, lead salts, etc. are preferred for this purpose. Similarly when using salt forming azo compound I precipitate their alkaline earth metal and heavy metal salts and use them for combination with the nitro rosin.

The development can be carried out in neutral or alkaline solution with similar results, though in many instances an alkaline development is preferred. In many instances the addition of a dispersing agent to the development mixture is also preferred. I found that soaps, sulfonated vegetable and animal oils, such as Turkey red oil, sulfonated castor oil, sulfonated cotton seed oil, Turkey red oil, sulfonated fish oil, etc. are particularly adapted for this purpose.

My invention is applicable to various azo dyestuffs of the following three types which are capable of being transformed into pigments.

*Mono-azo monosulfonic acids.*—The sulfonic acid group is usually and preferably located in the first, or diazo component. These toners are more or less soluble in the form of their free acids or alkali metal salts and are rendered insoluble by treatment with an alkaline earth or heavy metal salt. Instances of such combinations are the compounds formed by coupling 1. Diazotized 2-naphthylamine 1-sulfonic acid with beta naphthol (Lithol red, Colour Index No. 189).

2. Diazotized para-nitraniline ortho-sulfonic acid with beta naphthol (Lake red P, Colour Index No. 158).

3. Diazotized 2-naphthylamine 1-sulfonic acid with salicylic acid.

4. Diazotized para-toluidine metasulfonic acid with the anilide of beta oxynaphthoic acid.

*Mono-azo monocarboxylic acids.*—The carboxylic acid group may be in either component and the component not containing the carboxylic group may or may not contain a sulfonic acid group. These toners are more or less soluble as their free acids or alkali metal salts and are rendered insoluble by treatment with an alkaline earth or heavy metal salt. For example, such toners can be formed by coupling 1. Diazotized para-toluidine metasulfonic acid with beta oxynaphthoic acid (Lithol rubine, Colour Index No. 163).

2. Diazotized para-nitro ortho-toluidine with beta oxynaphthoic acid.

3. Diazotized anthranilic acid with beta naphthol (Lake red D. Colour Index No. 214).

4. Diazotized 2-naphthylamine 1-sulfonic acid with beta oxynaphthoic acid (Lake Bordeaux B, Colour Index No. 190).

*Azo pigment dyestuffs.*—This type of toner is a substantially insoluble dyestuff produced in the coupling itself and does not contain salt-forming groups. The following illustrative cases are formed by coupling 1. Diazotized para-nitro-aniline with beta naphthol (Para red, Colour Index No. 44).

2. Diazotized meta-nitro para-toluidine with aceto-acetanilide. (Hansa yellow G).

3. Diazotized para-nitro ortho-toluidine with beta naphthol (Pigment orange R, Colour Index No. 68).

4. Diazotized alpha-naphthylamine with beta naphthol (Autol red RL, Colour Index No. 82).

For the sake of convenience and in accordance with commercial and industrial practice the term beta-oxynaphthoic acid is used herein to designate the 2.hydroxynaphthalene-3.carboxylic acid.

For the purpose of this invention and in accordance with commercial practice, a "toner" is defined as an organic pigment which may or may not contain salt-forming groups and which is not associated with a substratum or extender; and a "Lake" is an organic pigment which contains a substratum or extender. In the former type of pigment the true coloring matter is produced directly in an insoluble form and can be used for various purposes as such, without the addition of a substratum; in the latter type the true coloring matter is associated intimately with a substratum, which is commonly an inorganic substance, such as alumina hydrate, blanc fixe, etc. or combinations of the same.

The choice between the two types of pigments depends largely upon the intended use, there being various essential differences in their properties, which relate to texture, dispersion, oil absorption, bulking value, and behavior in vehicles. These differences are best explained by the following illustrations.

The alkaline earth salt of the dyestuff prepared by coupling diazotized para-toluidine metasulfonic acid with beta oxynaphthoic acid may be used as such (toner form) or may be extended with a substratum consisting of alumina hydrate and blanc fixe (lake form). For use as a rubber pigment it has been found that the lake form has definite advantages over the toner in respect to (a) greater strength for the same dyestuff content, (b) reduction of the tendency to crock, and (c) blending with other pigments. Similarly, in the application of pigments to linoleum the lake or extended type of pigment has a definite advantage because of ease of dispersion. In paints and enamels, toners are generally used for their advantages in such properties as gloss; however, in the case of the cheap Para reds (so-called Grinder's reds) a substratum is an aid in the grinding of the paint. In the field of printing inks, the lake form of pigment may offer an advantage over the toner form under certain conditions where texture is an important problem. On the other hand, toners show advantages from the point of view of allowing the ink-maker greater freedom in the choice of white base (extender) which he grinds into the ink; however, under certain conditions the combination of toner and white pigment ordinarily used in the ink might be replaced by a lake color which would result in simplification in the manufacture of the ink.

The present invention relates to the lakes which contain a substratum, and they can be obtained from the toner type of azo compounds as well as from the azo compounds which only by association with a substratum become a pigment, or lake, in both instances the azo compound is substantially water insoluble before developing or becomes so during development.

The products of the present invention combine to a certain extent the color strength and properties of a toner with the properties usually found in a lake formed with an inorganic substratum.

The amount of nitro rosin incorporated as a substratum in my novel lakes and pigments is not of particular significance. From amounts of about 5% on there is a remarkable improvement in the shade and other tinctorial properites of the pigments, particularly in respect to clearness and brightness of shade. The same improvements are noted in pigments containing large amounts of nitro rosin and such larger amounts do not greatly affect the strength of the pigment, and the amount of nitro rosin substratum to be used in my lakes and pigments depend largely upon the desired color strength.

My novel azo lakes and pigments are characterized chemically by containing as the substratum a nitro rosin. They have brighter and cleaner shades than similar azo lakes and pigments made with inorganic substrata.

The following are a few examples of how I prepared novel lakes and pigments according to my invention.

It will be understood that my invention is not limited to these examples or to the individual manipulation steps described therein. Similar results are also obtained with other azo compounds which are capable of forming lakes or pigments on development in the presence of a substratum and similar results are also obtained by using in the development other alkaline earth and heavy metal salts of the azo coloring compound and the nitro rosin.

*Example I.*—A solution of 41.8 parts of the sodium salt of a para-toluidine metasulfonic acid ($CH_3:SO_3:NH_2=1:3:4$) is diazotized with 14.4 parts of nitrite of soda and 52 parts of 20° Bé. muriatic acid.

40 parts of beta oxynaphthoic acid $$(OH:COOH=2:3)$$

are dissolved in a solution of 16.3 parts of caustic soda and 200 parts of water. To this are added 40.3 parts of soda ash in 400 parts of water. The temperature and volume of the beta oxynaphthoic acid solution is adjusted to 40° C. and 1000 parts of solution, and the above described diazo preparation is then run in whereupon the azo coupling proceeds quickly and to good completion. After stirring a short time the dyestuff is filtered.

The soda salt dye paste is then re-slurried to 16,800 parts of solution at 40° C. To this are added 9.6 parts of para soap in 50 parts of water. In a separate container 32 parts of nitrated rosin are added to a solution of 6.5 parts of caustic soda in 400 parts of water, and the solution boiled until the formation of the soluble nitrated rosin soap is complete. This nitrated rosin soap solution is then added to the dye solution and the temperature adjusted to 40° C. and stirred 15 minutes.

In a separate container 80 parts of calcium chloride are dissolved in 2000 parts of water and the temperature adjusted to 27° C., and into this is then run in 10 minutes the dye soap solution. There is then added 41 parts of caustic soda in 500 parts of water and the slurry stirred for 15 minutes. The charge is then heated to the boil and digested at this temperature for ½ hour, after which it is washed, filtered and dried in the usual manner.

The yield is approximately 104 parts of pigment compared with 92 parts in a charge carried out in exactly the same way but without the nitrated rosin. The lake contains about 11% of the calcium salt of nitrated rosin. The lake is equal in strength to the normal product and has a bright, clean shade.

I claim:

1. In a process of preparing azo lakes and pigments the step of developing an aqueous suspension of an azo coloring compound in the presence of an insoluble salt of a nitrated rosin.

2. In a process of preparing azo lakes and pigments the step of developing by heating an alkaline, aqueous suspension of an insoluble salt of an azo coloring compound and an insoluble salt of a nitro rosin.

3. A lake or pigment comprising an azo coloring compound combined with a substratum comprising an insoluble salt of a nitro rosin.

4. A lake or pigment comprising a water insoluble azo coloring compound combined with a substratum comprising a water insoluble salt of a nitro rosin.

5. A lake or pigment comprising an alkaline earth metal salt of the azo compound obtained by coupling diazotized para toluidine metasulfonic acid with beta oxynaphthoic acid combined with a substratum comprising an alkaline earth metal compound of nitro rosin.

ALFRED SIEGEL.